Sept. 26, 1967   S. W. STRICKMAN   3,344,093
RESINOUS COMPOSITION AND METHODS OF MAKING
AND FOAMING THE SAME
Original Filed Oct. 29, 1963   3 Sheets-Sheet 2

INVENTOR.
SAMUEL W. STRICKMAN
BY Jacobi & Davidson

ATTORNEYS.

Sept. 26, 1967  S. W. STRICKMAN  3,344,093
RESINOUS COMPOSITION AND METHODS OF MAKING AND FOAMING THE SAME
Original Filed Oct. 29, 1963  3 Sheets-Sheet 3

INVENTOR.
SAMUEL W. STRICKMAN
BY Jacobi & Davidson

ATTORNEYS

United States Patent Office 3,344,093
Patented Sept. 26, 1967

3,344,093
RESINOUS COMPOSITION AND METHODS OF MAKING AND FOAMING THE SAME
Samuel W. Strickman, Bayside, N.Y., assignor to Rosen and Strickman, Newark, N.J., a copartnership composed of Jacobi J. Rosen and Samuel W. Strickman
Original application Oct. 29, 1963, Ser. No. 319,911, now Patent No. 3,261,895, dated July 19, 1966. Divided and this application Dec. 2, 1965, Ser. No. 511,206
6 Claims. (Cl. 260—2.5)

ABSTRACT OF THE DISCLOSURE

Heat foamable plastisol mixes formed from vinyl chloride resins, plasticizers therefor, blowing agents, specifically alkali metal perborates and an oxygen adsorber. This last component is a finely divided solid particulate material which first adsorbs oxygen and controllably releases the same at the foaming temperatures of the plastisol at a rate which produces a stable cellular foam. The perborate releases oxygen at temperatures above about 200° F. sufficient to foam the plastisol and expand the same to at least three times its original volume, an acidic component such as an alkali metal hydrogen phosphate being included to facilitate the decomposition of the perborate. The oxygen adsorbing agent is not added to the other constituents until they are thoroughly mixed otherwise the compositions will not function satisfactorily. The material is preferably utilized in the manufacture of liners or gaskets for container closures wherein it is foamed in situ, preferably in the form of an annular ring.

This application is a division of copending application Serial No. 319,911 filed October 29, 1963, now Patent No. 3,261,895, which in turn is a continuation-in-part of prior applications Serial No. 49,659, filed August 15, 1960, and Serial No. 49,655, filed August 15, 1960, and in turn is also a continuation-in-part of prior applications Serial No. 742,816 filed June 18, 1958, and Serial No. 829,451, filed July 24, 1959, the last four mentioned applications all now being abandoned.

The present invention relates to resinous compositions and methods of making and foaming the same, these compositions being particularly adapted for use in lining closure caps such as crown closures or the like.

The crown type seal has a cushion pad or liner with a two-fold purpose: firstly, to prevent contact of the contents of the container with the shell body from which the crown type cap is produced, and secondly, to provide a gasket to conform to the possible irregularities between the lip of the container and the closing surface of the crown type cap. Prior practices for providing crown type closures have generally been (1) to make such pads of composition cork with a "spot" of metal foil, (2) to form the pads or liners of resinous compounds so as to have a uniform thickness over the entire top panel of the closure shell as well as the depending skirt or (3) to form such pads with a thicker annular area of the same material for engaging the lip of the container. In general, materials having high resistance to penetration would not demand as great a thickness for the first purpose as would be required to provide the necessary sealing gasket for conformation to the container lip. Accordingly, it is highly desirable from an economic point of view to provide resinous compositions for use in crown seals in which the liner or cushion pad has a thick outer annular portion of excellent resealable properties for engagement with the container lip and a thinner central portion having a high resistance to penetration to provide assurance against contact with the contents of the container.

The art has heretofore employed elastomeric or plastic materials of varying description, including plastisols of polyvinylchlorides, in the search to find more economically feasible materials for preparing the liner and/or seal having the hereinbefore mentioned characteristics. Foamable as well as non-foamable plastisols of polyvinylchloride have been heretofore employed. As their use has heretofore generally required some form of shaping of the surface of the liner to impart the desired liner characteristics mentioned above, the central portion covering the area to come in contact with the container's content and the thicker annular sealing portion are of the same material. The use of heretofore known foamable plastisols as liner materials in crown type closures has been curtailed because existing blowing agents prepare foams unsuitable for such use because residues therein are readily extractable by the container content and are toxic or off-flavor imparting or because such known blowing agents require techniques of application which are not readily amenable to limiting the foamed material in its contact with the container's content.

Prior known methods for forming liners in crown type closures employing such plastisols are generally characterized either (1) by employing a heated plunger and/or a cold plunger with a heated cap to form or shape the polymeric material to the desired surface characteristics of the liner and/or seal during some period of the required fluxing and/or curing steps, (2) by using centrifugal force to position the plastisol deposited as a glob in the interior upper surface to the desired surface characteristics by spinning the cap at relatively high speeds, or (3) by depositing a ribbon of the plastisol adjacent to the depending skirt portion of the closure from a point discharge outlet while the cap is rotated. Such prior art procedures are accompanied by a number of serious drawbacks. The use of a plunger to form the pad or liner of desired configuration requires expensive and complicated apparatus as the tolerances required of such plungers are relatively critical and it is necessary to contact the plunger with the plastisol during some period of the required curing steps thereby severely limiting the rate at which the caps can be produced. The known spinning techniques are limited in the rate of production and control of the distribution of the plastisol is difficult at best and the depending skirt is inadvertently and unevenly coated with plastisol and/or the thickness of the resulting gasket is subject to considerable variation. Moreover, the seals prepared by such methods require a relatively large quantity of plastisol with concomitant high rate of cost.

Accordingly, it is one feature of the present invention to provide resinous material for use in closure seals having cushion pads requiring a substantially lesser quantity of material to form than the cushion pads or liners employed in similar closures heretofore known.

A further feature of the invention is the provision of compositions for the manufacture of a crown type closure comprising a crown shell having a top panel, curved corner radius, depending skirt and a liner having a thin central portion formed from a non-foamable plastisol and a thicker annular portion of vinyl foam taking the form in cross section of a quadrant disposed peripherally about the inside surface of the shell having its arcuate surface extending between the top panel and some point on the curved corner radius adjacent the depending skirt, thus having a major portion of the foam adapted to surround the outside of a container mouth and only a flattened edge portion of the foam in sealing engagement with the top sealing edge of the container mouth. In the production of closure caps using the compositions of this invention the inner surface of the shell may be coated with an impervious coating and a thin central portion of non-foamable plastisol may be so disposed as to overlie the inner surface of the top panel to come in contact with the content of the container but such that the periphery of the thin central portion is free of engagement with the curved corner radius and to a limited peripheral portion of the thinner central portion in such manner that the cured vinyl foam will have a minimum of contact with the content of the container assuring the production of a liner with a surface which is inert and impervious to the content of the container and one which has excellent reasealable properties for engaging the lip of the container, and further assuring good adhesion of the liner to the crown shell adjacent the outer edge thereof.

Another feature of the invention is the provision of a material for use with an extrusion means having an annular shaped discharge outlet to deposit, at ambient temperatures and pressures, in the inner surface of a crown type closure an annular shaped extrudate of the heat foamable plastisol taking the form in cross section of a quadrant having its arcuate surface extending between the top panel and depending skirt of the closure confined to a predetermined area of the inner surface by a die element cooperating with the annular shaped outlet so that the heat foamable plastisol can be foamed and cured at ambient pressures avoiding the use of a shaping plunger to form or shape the surface of the liner during the curing steps and enabling the application to the inner surface of the top panel of one material having outstanding characteristics for assuring against contact thereof with the contents of the container and the application of the material of this invenion having outstanding resealable properties to the limited area of the inner surface of the closure for engaging the lip of the container.

Another feature of this invention is to provide a viscous gasket forming material for use on the inner surface of a closure cap in a rapid manner as a charge of uniformly continuous, substantially orbiculate configuration being positioned so that the charge is confined to the area of closure which will have minimum contact with the contents of the container, specifically that portion of the interior surface of the closure which will have contact with a sealing portion of a container in use.

Yet another feature of the present invention is to provide foamed polyvinylchlorides devoid of the disadvantages present in foamed resinous materials set forth above by providing a novel means of foaming the polyvinylchlorides by utilization of oxygen, released in situ, as the "blowing agent," together with an oxygen adsorbing agent for controlling the rate of foaming and concomitant properties of the resulting foam.

Further features and advantages of the persent invention will become apparent from the more detailed description thereof as hereinafter set forth and the illustrative practice of the invention shown in the accompanying drawings in which.

Like reference characters refer to like parts throughout the several views of the drawings.

It is to be understood that although the material of this invention is particularly adapted for use in forming an annular sealing gasket on a crown closure, it will find many other utilities wherein a heat foamable plastisol mix is suitable. For example, the material of this invention can be used to form a liner for a closure according to to the various prior art techniques discussed above, or for coating various items such as nails or barrel bungs or for forming self-supporting foamed articles such as seat cushions all as shown and described in prior applications Serial Nos. 49.659 and 742,816 mentioned hereinabove. However, to facilitate an understanding of this invention the following description will be limited to the production of annular sealing gaskets for crown closures or the like although the earlier applications may be referred to for amplifying the various uses of this material.

Subsequent portions disclose a number of preferred features of extreme importance in the preparation of closures of the crown type. Once again, although the crown type closure has been selected herein for purposes of illustration and although the material of this invention is particularly adapted for the manufacture of improved crown seals it is to be understood that the various features of the invention can be applied to other closures where it is desired to obtain a foamed sealing gasket in a relatively simple, efficient, rapid and economical manner or to the manufacture of other self-supporting foamed articles or foam coated articles.

Figure 1:
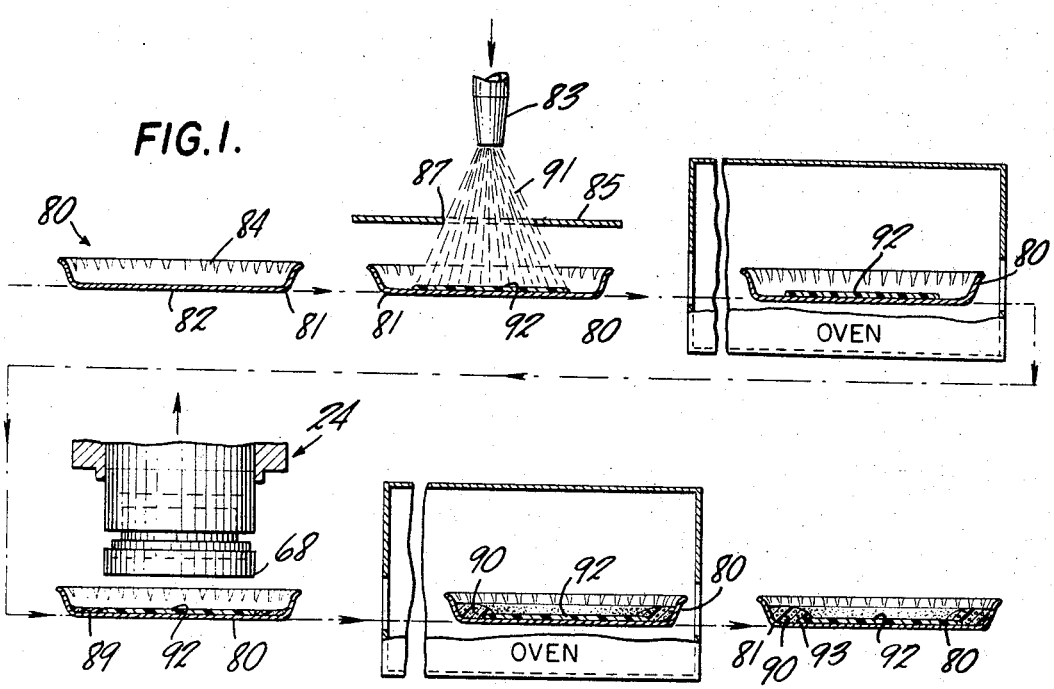
FIGURE 1 is a flow diagram showing one embodiment of a method using the material of this invention to form an annular sealing gasket on a crown closure.
Figure 2:
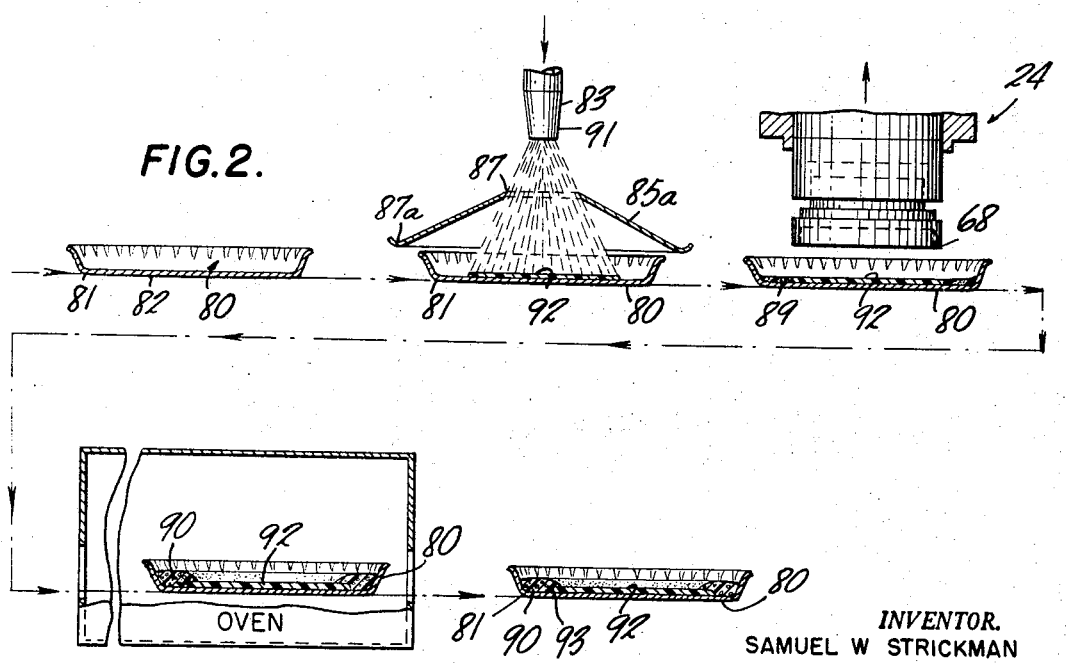
FIGURE 2 is a flow diagram showing another method for using the material of this invention to form an annular sealing gasket on a crown closure.

Two of the preferred embodiments of methods of using the resinous materials of this invention are illustrated in FIGURES 1 and 2. Referring to FIGURE 1, a steel blank 80 is provided in which the circular end top panel 82 is bounded by a curved top corner radius 81 and a corrugated skirt portion 84. The outer surface of the blank is provided with a lithograph coating, not shown, and the inner surface of the blank is provided with a coating of vinyl resin lacquer, also not shown.

As a first step in the method, the steel blank 80 is positioned beneath a nozzle 83 which is adapted to dispense a measured quantity, preferably 50–60 milligrams, of non-foaming plastisol 92 as a spray, depositing a layer of uniform thickness as shown in the drawing at 92. Interposed between the blank 80 and the nozzle 83 is a baffle 85 having a circular opening 87 therein which serves to confine the spray of plastisol 91 to a predetermined area on the top panel 82 when the crown blank 80 is disposed coaxially with the opening. As shown in the drawing, the unfoamed plastisol is confined to the center area of top panel 82 spaced apart from the curved corner radius 81 preferably by from 1/16 to 1/8 of an inch. By positioning the center spot in this manner, flashing of the plastisol during subsequent steps in the method is avoided. Also, the spacing permits direct application of the foamable fluid mix onto the lacquer coating and permits formation of a stronger bond between the final sealing ring and the blank.

Following the application of the non-foaming plastisol as a center spot, the blank 80 is passed to an oven as shown, where the layer of plastisol is heated to a temperature above 200° F., preferably from 320° F.–350° F., for 1 to 3 minutes to flux the resin and to at least partially cure it. Alternatively, the blank 80 can be passed under a suitable source of heat rays such as an infrared lamp means or an ultra-violet lamp means. Following this step the blank and plastisol center spot are cooled and the blank 80 is positioned beneath a suitable apparatus for dispensing a foamable fluid mix in a ring form, such as dispenser 24 described in parent application Ser. No. 319,911 which may be referred to for more detail. The dispenser 24 deposits a measured quantity, preferably between 100 and 110 milligrams, of a foamable fluid mix in accordance with this invention as explained in more detail hereinafter on the peripheral area of the top panel 82 adjacent the rounded corner radius 81 and the center spot of unfoamed plastisol 92.

The blank 80 is next inserted in an oven and the ring of foamable material is subjected to a temperature above 200° F., preferably between 280° F. and 310° F., for a period of less than 3 minutes to foam the ring to approximately 3 to 6 times its original volume. As shown in the last step of the flow diagram of FIGURE 1, a ring of the foamed polyvinylchloride 90 fills the area of the curved corner radius 81 extending upwardly to, but not covering, the edge of the corrugated skirt portion 84. In addition, during the foaming step, the ring 90 has overlapped a slight portion of the unfoamed plastisol center spot 92 as shown at 93. Generally speaking, the foamed ring of sealing material has the form in cross section of a quadrant having its arcuate surface extending between the top panel 82 and a point on the curved corner radius 81 adjacent the skirt portion 84.

An alternate embodiment of this invention is shown in FIGURE 2 wherein a blank 80 as shown in FIGURE 1 is coated with a center spot of unfoamed plastisol 92 and a peripheral ring of foamed fluid mix 90. In this embodiment, a conical baffle 85a is employed to facilitate recovery of the sprayed non-foamable plastisol which is retained by the baffle. A gutter 87a in the baffle 85 is provided to direct excess plastisol to a collecting means, not shown. In addition to this feature, the modified baffle provides less problems with fouling of the circular opening 87 with a consequent increase in the accuracy of measuring the amount of non-foamable plastisol applied as a spot 92.

It will also be noted that the modification shown in FIGURE 2 applies the peripheral ring of foamable plastic material according to this invention before the center spot is fluxed. Thereafter both the foamable and non-foamable materials are heated in an oven to foam and cure the foamable material and to cure the non-foamable material. In the practice of this embodiment, it is of course essential that the two materials have the compatible temperature requirements for foaming and curing.

The closure seal generally resulting from curing the charge of foamable plastisol deposited as above has excellent resealable properties and has a broad field of application. However, where the closure is of the crown type to be employed in closing containers having the content under substantial pressure, e.g., carbonated beverages, the cap blank with the foamable plastisol ring deposited as described above is preferably subjected to slow rotational motion and the rotating surface of the plastisol ring contacted with a skimming means having a concave arcuate contact surface extending between the top panel and the depending skirt of the closure blank for a period of time sufficient to dispose the annular shaped deposit into taking the form in cross section of a quadrant having its arcuate surface extending between the top panel and the depending skirt having a high degree of uniformity. A mechanism for performing this function is described in detail in parent application Ser. No. 319,911 referred to above and such application may be referred to for a more complete disclosure, if desired.

In general, the cap blank is rotated at speeds sufficiently slow to prevent movement of or irregularities in the surface of the deposited plastisol by centrifugal force of rotation. The skimming tool contact surface is maintained in contact with the surface of the plastisol ring for a period of time to sweep the surface so as to provide a ring having uniform height, i.e., one to two seconds.

In the method of this invention, the crown shells, or other closure caps, may be prepared in the customary fashion by providing a sheet of steel or tin plate with lithographed matter on one face and with a coating of a vinyl resin lacquer on the other or inner face. A further coating of non-foamable plastisol over the lacquer may be employed and in fact is a preferred embodiment. The charge of heat foamable plastisol is then applied to the peripheral portion of the inner face of the closure, i.e., that portion of the inner face of the crown shell which will permit a minimum of contact with the contents of the container for which the crown shell is to be used as a closure, and allow for a seal about the outside edges of the mouth of such container. Following the application of the heat foamable plastisol the closure blank is subjected to temperatures about 200° F., preferably between 280° and 310° F., for a period of time sufficient to foam the ring to approximately 3 to 6 times its original volume.

Figure 3:
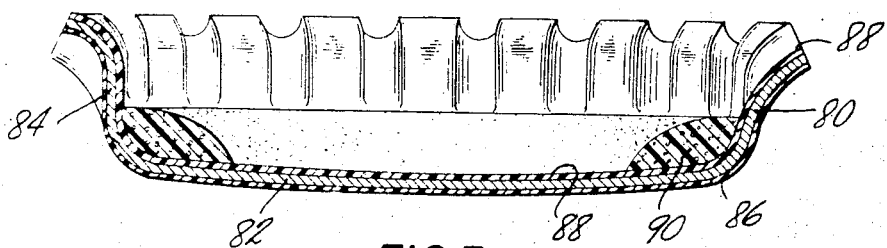
FIGURE 3 is a cross sectional view of a crown closure constructed utilizing the material of this invention to form an annular sealing gasket.
Figure 4:
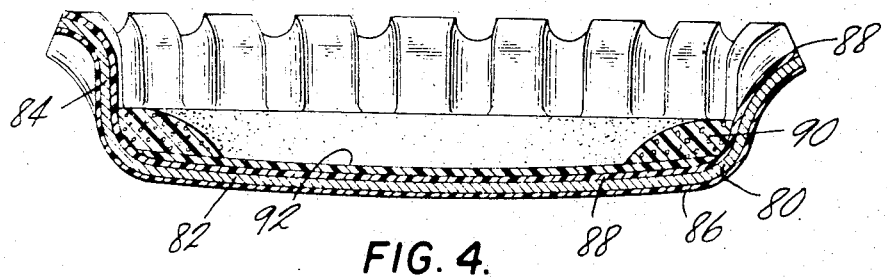
FIGURE 4 is a cross sectional view of a form of crown closure utilizing the material of this invention to form an annular gasket and provided with a plastisol liner.

Two embodiments of crown seals using materials according to this invention are shown in FIGURES 3 and 4. In FIGURE 3, the crown closure comprises a steel blank 80 having a top or crown panel 82 and a peripheral skirt 84 projecting therefrom and provided with crimps terminating in spaced relation to the crown panel. The outer surface of the blank 80 is provided with a lithographed coating 86. The inner surface of blank 80 is provided with a coating of lacquer 88. On the periphery of the inner surface is a gasket 90 of foamed polyvinylchloride composition according to this invention. The gasket 90 is of substantially orbiculate configuration and is confined to those portions of the blank 80 which will contact the top and side edges of the container mouth. The sealing gasket 90 has excellent adherence to the blank 80 and when placed upon a bottle and sealed forms an excellent seal which does not impart off-flavors to the contents of the container.

FIGURE 4 illustrates another embodiment of a crown prepared using materials according to this invention. In this embodiment, a coating of unfoamed plastisol 92 is applied to the inner surface of the blank 80 so that it overlies the lacquer coating 88 on the crown panel 82. This embodiment is of special advantage in instances where lacquer does not satisfactorily protect the steel crown from attack by container contents.

Figure 5:
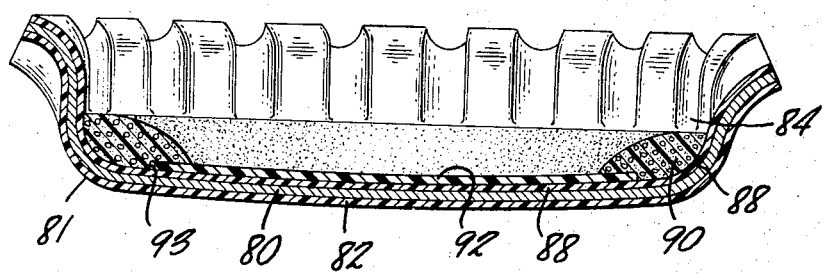
FIGURE 5 is a cross sectional view of yet another form of crown closure having an annular gasket of the material of this invention and provided with a center spot of cured, unfoamed plastisol spaced apart from the skirt portion.
Figure 6:
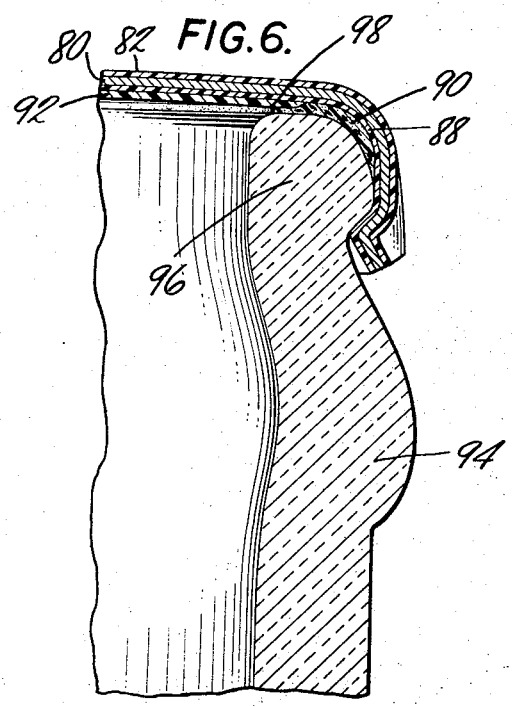
FIGURE 6 is a cross sectional view of a container carrying the crown closure of FIGURE 5 thereon in sealing relation with the container mouth.

FIGURES 5 and 6 illustrate a crown prepared according to the methods outlined in FIGURES 1 and 2. A spot of unfoamed plastisol 92 overlies the lacquer coating 88 in the central area of the crown panel which will eventually be directly exposed to the container's content. The spot 92 does not extend across the entire top panel 82. Instead, the spot 92 is spaced some distance, preferably from 1/16 to 1/8 of an inch, from the curved corner radius 81. The foamed ring 90 extends from a point on the curved corner radius 81 adjacent the skirt portion 84 to the spot 92 and a substantial portion of the ring 90 is in direct contact with the underlying lacquer coating 88, thus insuring a strong bond. Preferably, the ring 90 also slightly overlaps the spot 92, as shown at 93.

FIGURE 6 illustrates the relative positions of the unfoamed plastisol spot 92 and the foamed ring 90 after the cap 80 has been applied to a conventional container 94 having a lip 96. It will be noted that the ring 90 has undergone compression and that a minimum area of contact of the foamed material is presented to the interior of the container, as shown at 98, and that the ring provides a seal along the top and side peripheral edges of the beaded lip 96.

Having now described generally several methods of using the material of this invention for the manufacture of crown closures, a detailed discussion will follow of the material itself and methods of making and foaming the same.

Heat foamable plastisols according to the present invention comprise as basic ingredients (a) a resin, (b) a plasticizer therefor, (c) a foaming agent capable of releasing oxygen in situ at temperatures above about 200° F. and (d) an oxygen adsorbing agent for controlling the rate of foaming and the concomitant properties of the resulting foam such as density, deflection rate, hand, tensile strength and sealing characteristics.

It has been found that for crown liner seals for each 100 parts of resin, it is preferred to use from 42 to 100 parts of plasticizer, from 1 to 10 parts of blowing agents, from 10 to 60 parts of the oxygen adsorbing agent, and from 1 to 3 parts of stabilizer.

The resinous materials used according to this invention include the polyvinyl chlorides which may be of the well known stir-in type. Typical of this type of polyvinyl chlorides are the well known polyvinyl chlorides available commercially as "QYNV," Geon 121, VR 50, Opalon 410, and those produced by other well known manufacturers. In general, mixtures of a resin having a slow solvation rate and a resin having a fast solvation rate produces a foam having a desirable uniformity and cell structure. Preferred sealing characteristics in crown liners and/or seals are obtained with Opalon 410. Mixtures of Opalon 410 and Geon 121 are particularly preferred.

Other vinyl resins known in the art to be suitable for use in preparing foamed articles may be employed according to this invention. Thus, copolymers of vinyl chloride and vinyl acetate, such as the 97:3% copolymer, copolymers of vinyl chloride and ethyl maleate may be employed. In applications where the foam will be required to resist aqueous solutions, the chloride content of the polymer or copolymer should be high; preferably the copolymer should contain at least 90% of the vinyl chloride. Generally, the proportion of resin to plasticizer may range from 40 parts of resin to 60 parts of plasticizer depending on the nature of the plasticizer.

A wide variety of plasticizers well known in the resin and plastics art may be used, such plasticizers are either monomeric or polymeric, or a combination of both. Illustrative of the monomeric types are acetyl-tributylcitrate, glycollic acid esters, butyl-decyl-phthalate, octyl-decyl-phthalate, dioctyl phthalate, tricresylphosphate, triphenyl-phosphate, dicapryl-phthalate, dioctyl-sebacate, dioctyl-adipate, diisooctyladipate, diisooctyl phthalate, Harflex 500, a migration-resistant, low-temperature plasticizer having a specific gravity of 0.931, a flash point of 405° F., a fire point of 485° F., and a weight of 7.76 pounds per gallon. For crown closures to be used for carbonated soft drinks, acetyl tributyl citrate is a preferred plasticizer.

Among the polymeric types of plasticizers are the polymeric "Plastolein" plasticizers. The "Plastolein" plasticizers are primarily composed of esters and polyesters of azelaic and pelargonic acids. Exemplary of useful materials are "Plastolein 9720" (see bulletin entitled "Plastolein Plasticizers," copyright 1954) and "Plastolein 9758." Other polymeric plasticizers such as Harflex 300, a high molecular weight polymeric plasticizer and Harflex 330, a non-migratory plasticizer, may also be used.

It is to be noted that where the foamed material of this invention is used in connection with products for human consumption, as, for example, closures for containers of foods or beverages, it is desirable to utilize plasticizers or mixtures of plasticizers that are not readily subject to extraction by the food or beverage and which are not toxic. Accordingly, the polymeric (relatively high molecular weight) plasticizers which are not subject to complete or substantially complete extraction are preferred, although acetyl-tributyl citrate and the glycollates (even though they are monomeric) are useful.

The oxygen which is released in situ so as to foam the heat foamable mixtures of the invention is readily supplied by contacting an alkali metal perborate, peroxide and/or perchlorate with a component slightly more acidic than the oxygen supplying component, i.e., a component having a sufficient acidity as to the oxygen supplying ingredient so as to facilitate decomposition of the ingredient within the environment of the compositions thereby liberating oxygen in situ. Alkali metal perborates, particularly sodium perborate, are preferred. Exemplary acid components include acid salts of polybasic inorganic acids such as alkali metal hydrogen phosphates, alkali earth metal hydrogen phosphates; and metal salts of higher molecular weight organic carboxylic acids and weaker bases such as calcium stearate, aluminum stearate, zinc stearate, magnesium stearate, and the like. Disodium phosphate and Stayrite No. 90 (a mixture of metallic soaps, predominately calcium, aluminum and zinc stearates, with minor amounts of other fatty acids) are particularly preferred.

The oxygen adsorbing agents which may be used according to this invention may be any finely divided material which will adsorb a substantial portion of the gaseous oxygen evolved during the heating of the oxygen-producing material at a certain temperature and which will release the oxygen at a higher temperature. Examples of suitable oxygen adsorbing agents include finely divided anhydrous aluminum oxide, activated carbon, mica, silica gel, barium sulfate, carbon black, aluminum flake, resin-coated calcium carbonate, anhydrous borax, magnesium trisilicate and resin coated chalk. Anhydrous aluminum oxide is particularly preferred.

The proportions of acidic component, e.g., disodium acid phosphate and the oxygen supplying component, e.g., sodium perborate, can vary from 1:1 to 6 parts of phosphate to 45 parts of perborate. In general the oxygen supplying component as well as the acid phosphate should be of a state of division so as to pass through a screen having a mesh size of at least 200. When sodium perborate and/or anhydrous aluminum hydroxide are used as oxygen supplying and oxygen adsorbing components, respectively, the particles should pass through a screen size having a mesh of at least 325.

The sequence in which the ingredients of the foamable fluid mix are combined is an important feature of this invention. According to the preferred method, the vinyl resin must be mixed in and thoroughly wetted by the plasticizer before the oxygen adsorbing agent is added. If the reverse sequence is employed, the oxygen adsorbing agent is apparently unable to function properly, and it is not effective in adsorbing released oxygen. As a consequence, the blowing system fails.

The following examples are in accordance with this invention.

*A crown for bottles containing carbonated beverages—Standard size (1)*

A crown for bottles containing carbonated beverages wherein a liner, using a foamed material made in accordance with this invention in lieu of cork, is produced as follows:

The customary tin-coated steel shells, formed from tin-coated steel (lacquered to assure adhesion of the polyvinyl chloride) are employed. The lining material is a foamed fluid mix prepared from polyvinyl chloride (e.g., Opalon 410) 100 parts; plasticizer (Plastolein 9720) 80 parts; disodium phosphate (mesh size at least 200) 6 parts; sodium perborate (mesh size at least 200) 6 parts; resin-coated chalk (e.g., "Surfex MM"), 10 parts as filler, carbon black, 0.01 parts; ferric oxide, 0.15 parts as pigmenting materials.

The foregoing ingredients are worked up as follows:

To the plasticizer there are added the disodium phosphate and the perborate. They are stirred to make a good suspension. To that suspension there are added the carbon black and ferric oxide. These are thoroughly stirred. Then, with stirring, the resin is added and the mixture is thoroughly stirred. To the mixture is then added the filler (the resin-coated chalk), and the whole mass agitated until a smooth mixture is obtained. This fluid mass or mix is then de-aerated to remove entrapped air.

The fluid mix is passed through a metering device whereby about 275–350 mg. are deposited on each shell. The thus-coated shells are centrifugally spun and placed on a heated surface of about 270° F. for about 20 minutes, thereby to effectuate the foaming. Then they are placed in an oven at a temperature of about 350°–375° F. for about 5 minutes to effectuate fusion; and then removed from the oven and allowed to air-cool. They are ready for use.

Shallow-sized crown

A shallow crown can be provided with a liner of foamed resin in accordance with this invention wherein the amount of the plasticizer, disodium phosphate, perborate and pigments are used as in the manufacture of the standard crown described above. The resin component may be increased to 105 parts in the fluid mix to reduce resilience, if desired; and using as a filler, 20 parts of barium sulfate (e.g., "Sparmite").

Standard size crown (2)

A foamable fluid mix was prepared from the following ingredients in the indicated proportions:

Opalon 410, a commercial polyvinyl chloride or emulsion grade in powder form, having a particle size of 1–2 microns and a molecular weight of 70,000–80,000, 100 parts;

Harflex 330, a polymeric plasticizer, 40 parts;

Diisooctyl phthalate, a non-toxic plasticizer, 40 parts;

Hydrated aluminum oxide, (H-1), having a particle size such that 75–83% of the material passes through a 325 mesh screen, 20 parts;

Stayrite 90, a mixture of non-toxic metallic stearates, 1 part; and

Sodium perborate, 3 parts;

the parts being expressed by weight. (Disodium phosphate, at a level of 3 parts, may be substituted for the Stayrite 90 with comparable results).

The fluid mix was prepared by adding the Harflex 330 and the diisooctyl phthalate to a mixing vessel together with the sodium perborate and Stayrite. These materials are stirred to make a uniform suspension. The Opalon 410 resin is then added and mixed to thoroughly wet the resin powder with the liquid mixture. The aluminum oxide is then added and uniformly blended until a smooth mixture is obtained. The fluid mix is then de-aerated to remove entrapped air.

A conventional tin-coated steel shell is lacquered with a conventional vinyl resin lacquer. A non-foamable polyvinyl chloride plastisol comprising a mixture of emulsion grade polyvinyl chloride in a liquid plasticizer is sprayed in a thin layer on the inside top panel of the crown. The layer of plastisol is prevented from contacting the skirt portion of the crown. The layer of non-foamable plastisol is then heated to a temperature of 350° F. for one minute to flux the resin components of the plastisol and to cause it to set. As little as 50 mg. of unfoamed plastisol are applied in this manner.

After the crown has been returned to room temperature, a ring of the foamable fluid mix prepared about is applied to the peripheral area of the top panel of the crown in engagement with the skirt portion and with the previously applied layer of plastisol. Approximately 110 mg. of the foamable mix is applied in this manner. The crown is then heated to a temperature of about 300° F. for a period of three minutes to cause the ring of foamable material to foam. The ring expands to approximately three to four times its original volume, adheres to the top panel and to the skirt portion of the crown and takes the form in cross-section of a quadrant having its arcuate surface extending between the top panel and the skirt portion. The width of the foamed ring, i.e., distance between the inside and outside diameter thereof, is approximately ⅛ inch. The crown is then cooled and is ready to apply as a closure to bottles containing carbonated beverages.

The sealing characterstics of the crown prepared according to this example are excellent and surpass, in some respect, the sealing characteristics of cork liners. In addition, no reaction takes place between the carbonated beverages and the liner or the cap itself. Furthermore, no off-flavors are imparted to the contents of the container because the plasticizer and other ingredients of the foamable material are essentially non-reactive with the container's content.

Additional foamable fluid mixes

Table 1 below gives the formulations of nine additional foamable fluid mixes which may be employed according to this invention. The compositions illustrate a number of oxygen adsorbing materials which may be employed, either alone or in combination with another oxygen adsorbing material. These mixes were prepared following the method set forth above, care being taken that the vinyl resin was thoroughly mixed with and wetted by the plasticizer before the oxygen adsorbing material was added to the mix.

TABLE 1.—FOAMABLE FLUID MIX
[Parts by weight]

| Ingredient | A | B | C | D | E | F | G | H | I |
|---|---|---|---|---|---|---|---|---|---|
| Geon 121 | | | | | 100 | 50 | | | 38 |
| Opalon 410 | 100 | 100 | 100 | 100 | | | 50 | 50 | 62 |
| Dioctyl phthalate | 90 | 90 | 90 | 90 | 90 | 45 | 45 | 45 | |
| Plastolein 9720 | 12 | | 12 | 12 | | 6 | 6 | 6 | |
| Harflex 500 | 30 | 30 | 30 | 30 | 30 | 15 | 15 | 15 | |
| Disodium phosphate | 6 | 12 | 6 | 6 | 3 | 3 | 3 | 3 | |
| Sodium perborate | 25 | 25 | 15 | 45 | 25 | 12.5 | 12.5 | 12.5 | 3 |
| Mica, No. 75 | 5 | | 2 | 2 | | | 2.5 | 5 | |
| Syloid 244 | 1.5 | | 1 | 1.5 | 10 | | | 1.25 | |
| Activated Carbon | 0.5 | | | | | | | | |
| Santicizer 141 | | 12 | | | 12 | | | | |
| Anhydrous borax, powdered | | 25 | | | | | | | |
| Aluminum flake, metal powder | | | | 1 | | | | | |
| Raven Black (carbon) | | | | 0.5 | | | | | |
| Sparmite (Barium sulfate) | | | | | | 1.25 | | | |
| Acetyl-tributyl citrate | | | | | | | | | |
| Stayrite 90 | | | | | | | | | 100 |
| Aluminum oxide, anhydrous | | | | | | | | | 1 |
| Coloring agent | | | | | | | | | 20 |
| TiO₂ | | | | | | | | | .5 |
| | | | | | | | | | 10 |

Referring to the ingredients in Table 1 above, Geon 121 is a white powdery stir-in vinyl chloride resin having a molecular weight of about 70,000 to 80,000, a particle size such that 100 mesh on the Tyler scale when determined by wet screen analysis, a specific gravity of about 1.40, a bulk density of 20–25 pounds per cubic foot and a specific viscosity of about 0.57–0.63; and Opalon 410 is a white powdery stir-in vinyl chloride resin having a molecular weight of about 70,000 to 80,000, a particle size of 1–2 microns, a specific gravity of about 1.40, a specific viscosity of about 0.53–0.55 determined as a solution of 0.40 grams of resin in 100 ml. of cyclohexane at 25° C., a dry bulk density of about 0.25–0.35 grams per cubic centimeter. Similarly Plastolein 9720 and Harflex 500 are plasticizers and are described earlier in the specification. The Mica No. 75 is a finely divided mica. Syloid 244 is a highly porous pure silica gel in the form of a free flowing, white powder, having a density of 4.0–4.5 lbs./cu. ft. and a particle size of 2–3 microns. The Santicizer 141, an alkyl aryl phosphate. The aluminum flake is a finely divided metallic aluminum bearing the numerical designation 221. The Raven Black is a finely divided carbon. The Sparmite is a finely divided barium sulfate.

Fluid mixes described in Table 1 are useful in a variety of applications. Composition E requires 40 minutes of heating to fuse, whereas most of the other compositions will fuse within 20 minutes. Composition E will provide six-fold increase in volume. Composition H is particularly acceptable in that it provides a reasonably soft foam having good deflection characteristics. This composition provides a sixteen-fold increase in volume during unconfined blowing. Composition I is particularly useful and preferred as the heat foamable mix for depositing the annular foamed sealing ring in the liner of the crown type closures intended for carbonated soft drinks.

Screw-top closures for containers

Screw-top closures for glass or metal containers may be provided with liners made of foamed resin in accordance with this invention, in the place of the wax-coated or resin-coated paper lined or rubber gasketed closures or plastisol liners heretofore used. The foamed liner material in accordance with this invention enables one to obtain a better seal at considerably lower cost. A suitable composition is a fluid mix such as that used for manufacturing either the standard size or the shallow crown above described.

A suitable amount of the fluid mix is deposited on the screw-top shell. The heating to effectuate the blowing thereof, and the subsequent "ovening" to effectuate fusion of the foamed material, are carried out as described above.

It will be understood, of course, that the metal shell should be provided with a suitable lacquer coating to provide for adherence of the foamed liner.

It will be noted that the foamed products and articles provided therewith which are made in accordance with this invention result from the heating of a fluid mix comprising polyvinyl chloride, plasticizing material (a single plasticizer or a plurality of plasticizers), and an oxygen compound which is capable of releasing elemental or nascent oxygen when the mix is heated to about 200° F. to initiate gassing or blowing.

As has been shown, a suitable acidic component of the mixture, such as a metal hydrogen phosphate, e.g., an alkali or alkaline earth metal phosphate, as aforesaid, functions both as a stabilizer and as a reactant with the oxygen donor or releasor, for example, a perborate, a peroxide or a chlorate, etc.

Fluid mixes embodying the specifically named components shown above have a general composition as follows:

Based on 100 parts of polyvinyl chloride, the plasticizing material is present in an amount of from about 500 to 200 parts, preferably from 60 to 25 parts; the dual functioning stabilizer and acidic component, i.e., disodium phosphate is present in an amount from 3 to 25 parts, preferably from 6 to 12 parts; and the oxygen releasing compound, the sodium perborate as the blowing agent, is present in an amount from 2 to 45 parts, preferably 3 to 30 parts, based on the total amount of polyvinyl chloride and plasticizing material. In specific applications the determination of the amount of blowing agent employed is adjusted according to need, i.e., the crown takes 6 parts of blowing agent, a cushion takes 25 parts of said blowing agent and other products, sufficient blowing agent to provide suitable expansion.

As to the amount of the filler-adsorber component of the mix, it varies according to the desired use of the end products with respect to resilience of the foamed material and the adsorptive quality of the filler in providing the specific desired volume of the blown or expanded material. While the amount of the filler or oxygen adsorbing agent to be used for specific applications may readily be determined by a laboratory test, it may be present, relative to the blowing agent, in a ratio of from 1:1 to 60:1, by weight.

The theoretical considerations underlying the amounts of filler-adsorber to be used appear to be as follows: The amount of filler-adsorber and blowing agent may be varied as stated above, but the amount of filler-adsorber present with any given amount of any given blowing agent must be sufficiently small that subsequent liberation of oxygen provides a cellular structure and sufficiently large to prevent at least substantially uncontrolled oxygen release. Merely adding a substantial quantity of filler having oxygen adsorbing properties, without adjusting the amount thereof as herein specified, causes adsorption by too many different filler particles and results in insufficient ultimate blowing. In accordance with these theoretical considerations, an oxygen adsorbing agent is a composition present in sufficient amount to control, but not suppress, blowing.

Thus, it will now be seen that there is herein provided improved resinous compositions and methods for making and foaming the same which satisfy all of the objectives of the instant invention, and others, including many advantages of great practical utility and commercial importance.

Since many embodiments may be made of the instant inventive concept, and since many modifications may be made of the embodiments, hereinbefore shown and described, it is to be understood that all matter herein is to be interpreted merely as illustrative and not in a limiting sense. Accordingly,

What is claimed is:

1. A heat foamable plastisol mix consisting essentially of
    (a) a finely divided particulate resin selected from the group consisting of vinyl chloride homopolymers and copolymers;
    (b) a plasticizing amount of a plasticizer for (a);
    (c) an effective amount of an alkali metal perborate capable of releasing sufficient oxygen at temperatures above about 200° F. to foam said plastisol and expand the same to at least about 3 times its original volume;
    (d) an effective amount of an acidic component having an acidity as to (c) sufficient to facilitate the decomposition thereof; and
    (e) an effective amount of a finely divided solid particulate component which first adsorbs oxygen and controllably releases the adsorbed oxygen at the foaming temperature of the plastisol at a rate which produces a stable cellular foam.

2. The heat foamable plastisol mix defined in claim 1 wherein, based on each 100 parts by weight of (a), from approximately 50 to approximately 200 parts of (b) are present, from approximately 1 to approximately 45 parts of (c) are present, from approximately 1 to approximately 25 parts of (d) are present and from approximately 10 to approximately 60 parts of (e) are present.

3. The heat foamable plastisol mix defined in claim 2 wherein the weight ratio between (d) and (c) ranges from 1:1 to 6:45 and the weight ratio between (e) and (c) ranges from 1:1 to 60:1.

4. The heat foamable plastisol mix defined in claim 1 wherein (c) is sodium perborate.

5. The heat foamable plastisol mix defined in claim 1 wherein (d) is selected from the group consisting of an alkali metal hydrogen phosphate, a non-toxic metallic soap and mixtures thereof.

6. The heat foamable plastisol mix defined in claim 1 wherein (e) is selected from the group consisting of anhydrous aluminum oxide, resin-coated chalk, activated carbon, mica, silica gel, barium sulfate, carbon black, aluminum flake, resin-coated calcium carbonate, anhydrous borax, magnesium trisilicate and mixtures thereof.

References Cited

UNITED STATES PATENTS

| | | | |
|---|---|---|---|
| 2,540,040 | 1/1951 | Baker | 260—2.5 |
| 2,868,765 | 1/1959 | Haefner | 260—45.7 |
| 3,055,848 | 9/1962 | Heckmaier et al. | 260—2.5 |
| 3,202,307 | 8/1965 | Rainer et al. | 260—2.5 |

MURRAY TILLMAN, *Primary Examiner.*

J. C. BLEUTGE, *Assistant Examiner.*